United States Patent Office 2,980,080
Patented Apr. 18, 1961

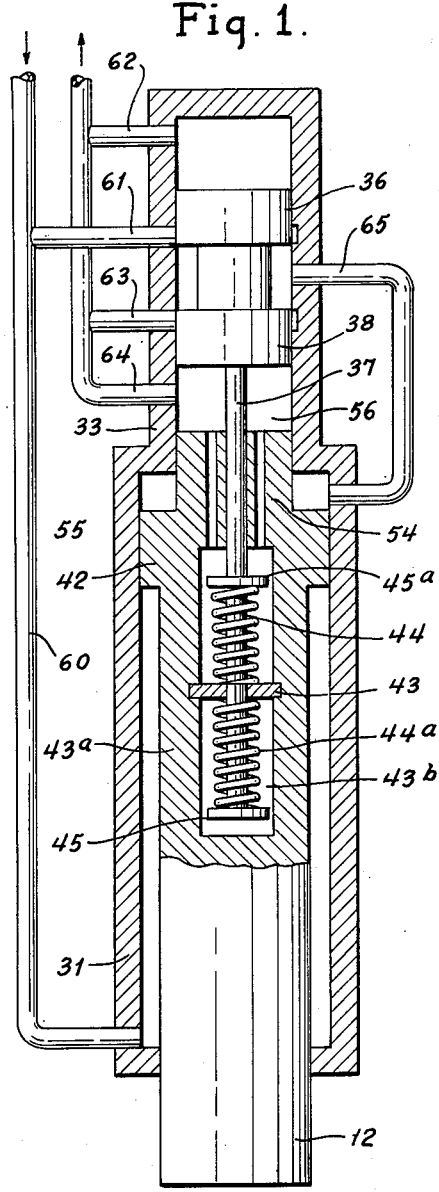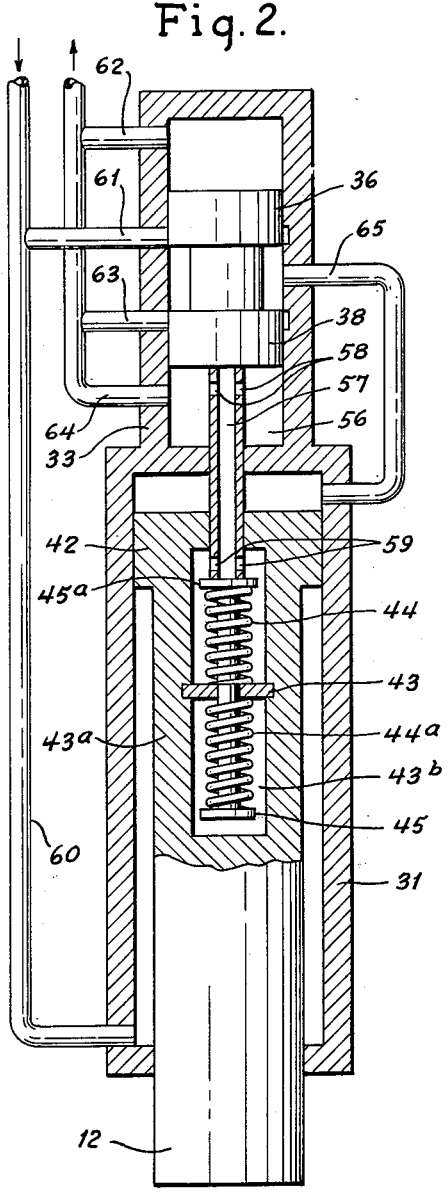

2,980,080

VIBRATOR

Karl-Evert Anders Joelson, Nyköping, Sweden, assignor to Aktiebolaget Industrikompaniet, Stockholm, Sweden, a corporation of Sweden Filed June 29, 1959, Ser. No. 823,517

Claims priority, application Sweden July 1, 1958

3 Claims. (Cl. 121—164)

The inventor has already suggested a vibrator comprising a piston reciprocating in a cylinder and having a piston rod, and a valve body moveable in a valve casing for supplying pressure liquid from a hydraulic pressure source to the cylinder. In operation, the side of the piston connected to the piston rod is permanently exposed to the pressure of the liquid from this source, and the opposite side of the piston is arranged to be connected to the source of liquid or to an outlet, respectively, according to the position of the valve body. This hydraulic vibrator may be set to work at high frequency, for instance 4000–6000 strokes/min., and with high efficiency and, at the same time the apparatus has small dimensions. The vibrator may with great advantage be utilized for rock drills, for example.

The piston and the valve body are connected to each other by follower or connecting means, for instance a spindle or a connecting rod, by the intermediary of a spring system which, for instance may be fitted in a chamber within the piston itself or within its piston rod or in the valve casing or at some other place. This connecting rod between the valve body and the spring system—as well as this spring system—must not be exposed to any essential pressure from the hydraulic liquid acting in axial direction of the piston, since in such a case the connecting rod might inadvertently displace the operative position of the piston, which may result in unbalanced stresses on the spring system so that the machine stops. In order to avoid this trouble, the chamber containing the spring system and in which this spring system is connected to said connecting member, communicates, according to the invention with the outer atmosphere or an outlet for the pressure fluid through one or more vents or passages.

The communication between the spring chamber and the atmosphere or the outlet, respectively, may for instance be effected through the connecting rod, if this is tubular or is fitted with a suitable communication passage, or through one or more passages in an extension of the piston arranged at the opposite side thereof in relation to its piston rod side.

The invention will be described more in detail below, with reference to the accompanying drawing illustrating in Figs. 1 and 2 diagrammatically longitudinal sections of two embodiments.

In Fig. 1, 31 is a cylinder in which a piston 42 is slideable axially. The piston is connected to a piston rod 12 or such like, which sealingly extends through one of the end walls of the cylinder and the cross sectional area of which may be for instance approximately one half of that of the piston 42, or larger. A valve spindle 37 is axially moveable in a valve chamber 33, which is attached to or made integrally with the cylinder 31. The travelling directions of the piston and of the valve spindle are preferably parallel, and the valve spindle may be coaxial with the piston. The valve spindle is provided with two cams or slide-valve heads 36, 38, which are moveable in a valve chamber 56 in the valve housing, and which, depending on the actual position, open or close an inlet 61 or an outlet 63, respectively, for pressure liquid or a return conduit to the source of the pressure liquid. The valve chamber 56 also communicates with the cylinder 31 above the piston 42 through a passage 65. In operation, a conduit 60 leading from a pressure liquid source (pump), is constantly in open communication with the cylinder chamber below the piston 42. The valve chamber spaces above and below the valve heads 36 and 38, respectively, are drained through outlets 62 and 64, respectively, which are in communication with the atmosphere or, through return conduit, with the pressure liquid source.

The movements of the piston 42 are transferred to the spindle 37 either by means of either of two springs 44, 44a acting in opposite directions against each other and preferably mounted in a chamber in a recessed part 43a of the piston, or its piston rod. This chamber is fitted with an abutment 43 through which the spindle slides with a certain play. The springs, preferably with a certain pre-tension, engage at one end the abutment 43 and at the other end abutments 45 and 45a, respectively, mounted on the valve spindle. A movement of the piston 42 in either direction will result firstly in a compression of the corresponding spring and then in a movement of the valve spindle 37. On the opposite side of the piston in relation to the side at which the working-piston-rod 12 proper is mounted, the piston is provided with an extension in the form of a balancing or auxiliary piston rod 54, whereby the top area of the piston, being exposed to the pressure liquid, during the working stroke, as shown on the drawing, will be reduced so as to be approximately equally large as the cross sectional area of the working piston rod 12. This auxiliary piston rod 54 has one or more passages 55 which connect the interior of spring chamber 43b to the valve chamber 56 and thereby also to the outlet 64.

The vibrator operates in the following manner: On the lower end of the piston 42 there always acts a force which equals the specific pressure of the pressure liquid multiplied by the annular area of the piston around the piston rod 12. If the valve spindle 37 is in such a position that the valve head 38 opens the communication between the upper valve chamber and the outlet 63, when the supply of pressure liquid through the inlet 61 is shut off by the valve head 36, the piston will thus be exposed to a force acting upwards.

If, on the other hand, the valve spindle 37 is in a position in which the outlet 63 is closed while pressure liquid is supplied through the inlet 61 and the passage 65 to the upper piston chamber of the cylinder 31, the top end of the piston will be exposed to a force, which is equal to the effective upper area of the piston times the specific liquid pressure. However, at the same time an upward force acts on the lower end of the piston, as this is permanently exposed to pressure from the pressure source.

Thus, in order that the piston 42 may remain in a balanced position, the pressure at the upper end of the piston must be less than the pressure at the lower piston end. This result may be achieved by the valve spindle being in the neutral position shown in Fig. 1, in which the supply of pressure liquid through the inlet 61 and the discharge of liquid through the outlet 63 both are blocked, so that the specific liquid pressure in the upper part of the cylinder becomes lower than that in the lower part of the cylinder. If the movable parts of the vibrator are not disturbed by external forces, they tend to occupy this neutral position and, even after having been affected by an external force, they tend to regain the neutral position. They are, however, prevented from remaining in this position on account of the resilient or springy connection between the piston 42 and the valve spindle 37.

If under the influence of an external force, the piston is urged upwards, the spring 44 will be compressed, with the result that the valve spindle will be forced upwards. Hereby pressure liquid is supplied through the inlet 61, whereas the outlet 63 is closed. The pressure on the upper end of the piston 42 prevails and the piston will be urged downwards. This, again, results in a compression of the spring 44a which in its turn pulls the valve spindle 37 downwards. The supply of pressure liquid to the upper cylinder chamber is interrupted and, instead, communication to the outlet 63 is opened. The forces acting in upwards direction upon the piston 42 will now prevail, urging the latter upwards. All this results in rapid reciprocating movements of the piston 42 and thus also of the valve spindle 37. The neutral position will always be surpassed. The frequency of movement of piston and valve is very high.

When a new stroke starts, the piston 42 thus moves at an accelerating speed and pulls the valve spindle 37 in the same direction, but it should be noted that the valve spindle will be dragging behind owing to the mass of the valve spindle and spring connection with the piston, whereby the spring is compressed in accordance with the accelerating forces of the movement of the valve spindle. When this spindle has passed the neutral position and has arrived at such a position, that the direction of the liquid pressure on the piston is reversed, the working piston is stopped and moves in the opposite direction, but the valve spindle continues its movement until the spring system occupies its neutral position and has been tensioned sufficiently in the opposite direction to retard the valve spindle to stop, and then to start the movement in the opposite direction. The frequency and the amplitude of the vibrator and its piston respectively may be adjusted by modifying the dimensions of the springs 44, 44a. Adjustment may also be obtained, within certain limits, by changing the pressure and quantity of the liquid. The liquid pressure may, for instance, be 50–100 kg./cm.$^2$ In one example of a vibrator operating at 5–6000 strokes per min., the pressure was 70 kg./cm.$^2$ and the liquid consumption 120 lit./min., the stroke energy 6.4 kgm./stroke, the stroke length 8 m./m. and the piston velocity 6.5 m./sec. The invention is, however, by no means limited to these figures.

The pressure liquid may, for example, be oil or water. When drilling holes in rocks, water is flushed into the holes. The need of driving fluid of the vibrator approximately corresponds to the need of flushing water. It is therefore possible, when drilling far below the ground surface, as for instance a few hundred meters, to run the vibrator with water from the ground surface, thus without additional energy supply, as the energy of the water itself is sufficient. The piston rod 12 may be connected directly to the drill, so that both of them vibrate together, or the piston rod and associated members may transfer their vibration movement onto the drill rod.

The invention may be applied to a great many other fields, such as excavating and loading machines, the vibrator being connected to the excavating members in order to facilitate their insertion into the material to be transported. Further examples of advantageous applications are equipments for loosening material in hoppers and containers, feeding of goods in channel conveyors and dehydration of various kinds of goods (for instance thickening of pulp). If the machine is used as a percussion or striking machine, the stroke between the piston rod and the tool is adjusted so that the stroke is effected before the piston movement meets with counter pressure from the liquid. By the retardation of the working piston, the valve spindle catches up with the working piston and causes the direction of motion to be reversed.

If, through the application of a pressure reduction valve or such like, the pressure of the liquid supplied to the piston rod side of the piston, for instance, is inferior to the liquid pressure in the conduit 60, the forces from the liquid or liquids acting on both sides of the piston, may nevertheless be made equal, or approximately equal by a corresponding choice of the ratio between the outer diameters of the piston and piston rod.

Instead of two springs, one spring may be used, mounted for instance in the connection between the valve system and the piston, said spring, during the movement of the piston in one direction or the other, acting alternatingly as a pressure and a pulling spring, respectively. One may also arrange the springs in the valve chamber on either side of the valve system 36, 38, or in a chamber outside the valve casing.

Fig. 2 differs from Fig. 1 only insofar as the passages 55 in the balance piston rod 54 has been replaced by a passage 57 arranged in the valve spindle, and through vents 58, 59 connecting the spring chamber 43b with the valve chamber 56 and thus also with the outlet 64. Thus, in this case the valve spindle has a tubular shape.

What I claim is:

1. A vibrator device comprising, in combination, a working cylinder, a piston body movable in said cylinder and including a piston and a piston rod connected with said piston on one side of the latter, means for maintaining constant communication between the space in said cylinder on said one side of the piston and a source of hydraulic pressure, a valve casing fixedly connected to said cylinder, and a valve body mounted for reciprocation in said casing, said valve body serving to alternately connect the space in said cylinder opposite to said piston rod side to said hydraulic pressure source and to an outlet pressure lower than the pressure of said source so as to cause reciprocating movement of said piston, motion transmitting means connecting said piston body and said valve body to cause substantially the same displacement of the valve body and of the piston, said motion transmitting means comprising rigid connection means connected with said valve body, spring means connected with said rigid means and influenced by the piston movement for transmitting the piston displacement to the valve body with delay resulting from the elastic deformation of said spring means to enable a restarting action of said valve after the ceasing of the piston movement, a chamber in said piston body, means confining said spring means therein so as to displace the latter upon displacement of the piston body, and conduit means between said chamber and a source of constant pressure independent from the pressure of the hydraulic pressure source, for protecting said motion transmitting means from the effect of pressure from said hydraulic pressure source.

2. A vibrator device comprising, in combination, a working cylinder, a piston body movable in said cylinder and including a piston and a piston rod connected with said piston on one side of the latter, means for maintaining constant communication between the space in said cylinder on said one side of the piston and a source of hydraulic pressure, a valve casing fixedly connected to said cylinder, and a valve body mounted for reciprocation in said casing, said valve body serving to alternately connect the space in said cylinder opposite to said piston rod side to said hydraulic pressure source and to an outlet pressure lower than the pressure of said source so as to cause reciprocating movement of said piston, motion transmitting means connecting said piston body and said valve body to cause substantially the same displacement of the valve body and of the piston, said motion transmitting means comprising tubular connection means connected with said valve body and spring means connected with said tubular means and influenced by the piston movement, for transmitting the piston displacement to the valve body with a delay resulting from the elastic deformation of said spring means to enable a re-starting action of said valve after the ceasing of the piston movement, a chamber in said piston body, means confining said spring means therein so as to displace the latter upon displacement of the piston body, said tubular means extending through at least part of said chamber and within a space subject to said outlet pressure, said tubular means being formed with openings therein extending through the wall thereof connecting said chamber with said space subject to said outlet pressure through said tubular means so as to maintain said outlet pressure in said chamber and to prevent action of the pressure from said hydraulic pressure source on said motion transmitting means.

3. A vibrator device comprising in combination a working cylinger, a piston body movable in said cylinder and comprising a piston having a piston rod connected therewith on one side thereof and an extension formed on the other side of said piston, means for maintaining the cylinder space on said one side of said piston in constant communication with a hydraulic pressure source, a valve casing fixedly connected with said cylinder, said extension of said piston protruding into said valve casing and sealing off the inner space of said valve casing from the inner space of said cylinder, a valve body mounted for reciprocation in said valve casing for connecting the cylinder space on the extension side of said piston alternately with said hydraulic pressure source and with an outlet pressure lower than the pressure of said source so as to cause reciprocating movement of the piston, said valve body confining together with said extension a space constantly subject to outlet pressure, motion transmitting means for connecting said piston body and said valve body so as to cause substantially the same displacement of said valve body and said piston and comprising rigid connection means connected with said valve body and spring means connected with said rigid means and influenced by the movement of said piston for transmitting the displacement of said piston to the valve body with delay owing to the elastic deformation of the spring means so as to allow a re-starting action of the valve after the ceasing of the piston movement, a chamber in said piston body, means for confining said spring means therein so as to displace the latter upon displacement of said piston body, said extension being formed with channels extending through said extension, said channels connecting said chamber with said space subject to outlet pressure, so as to maintain the pressure within said chamber at the same level as said outlet pressure to prevent action of the pressure from said hydraulic pressure source on said motion transmitting means.

References Cited in the file of this patent
UNITED STATES PATENTS

| | | |
|---|---|---|
| 1,264,318 | McGrath | Apr. 30, 1918 |
| 1,665,046 | Tucker | Apr. 3, 1928 |
| 1,971,048 | Parsons | Aug. 21, 1934 |
| 2,310,750 | Schnell | Feb. 9, 1943 |
| 2,447,312 | Burt | Aug. 17, 1948 |
| 2,627,248 | Shaff | Feb. 3, 1953 |
| 2,826,176 | Chellis et al. | Mar. 11, 1958 |